United States Patent [19]
Komiya

[11] Patent Number: 4,798,397
[45] Date of Patent: Jan. 17, 1989

[54] VEHICLE SUSPENSION MECHANISM

[75] Inventor: Katsuyuki Komiya, Higashihiroshima, Japan

[73] Assignee: Mazda Motor Corporation, Hiroshima, Japan

[21] Appl. No.: 53,745

[22] Filed: May 26, 1987

[30] Foreign Application Priority Data

May 27, 1986 [JP] Japan .................. 61-80578

[51] Int. Cl.⁴ ................ B60G 7/00; B60G 3/00
[52] U.S. Cl. .................. 280/690; 280/660; 280/688
[58] Field of Search ........... 280/688, 713, 718, 724, 280/720, 710, 725, 690, 660, 673

[56] References Cited

U.S. PATENT DOCUMENTS

| 4,533,157 | 8/1985 | Hoenle et al. | 280/688 |
| 4,542,920 | 9/1985 | Kijima et al. | 280/690 |
| 4,613,153 | 9/1986 | Shibahata et al. | 280/688 |
| 4,629,211 | 12/1986 | Modglin et al. | 280/688 |
| 4,639,006 | 1/1987 | Aikawa | 280/660 |
| 4,705,292 | 11/1987 | Hespelt et al. | 280/660 |
| 4,714,132 | 12/1987 | Hattori et al. | 280/690 |

FOREIGN PATENT DOCUMENTS 59-39205 3/1984 Japan .

Primary Examiner—Richard A. Bertsch
Attorney, Agent, or Firm—Fleit, Jacobson, Cohn & Price

[57] ABSTRACT

A suspension mechanism including a lower arm carried by a vehicle body at one end and rotatably mounted on a wheel holding member at the other end, an assist link swingably mounted on the vehicle body at one end and fixed to the lower arm at the other end and a stabilizer of a certain torsional stiffness provided with a control link at one end portion, the control link being connected at one end to the assist link. The lower arm of the right suspension mechanism has the same structure as that of the left suspension mechanism to be commonly manufactured.

7 Claims, 4 Drawing Sheets

VEHICLE SUSPENSION MECHANISM

BACKGROUND OF THE INVENTION

1. Field of the Invention

The present invention relates to a suspension mechanism for vehicles, specifically to a structure for mounting a stabilizer on the suspension mechanism.

2. Description of the prior art

There has been commonly known a supension mechanism as disclosed in Japanese Utility Model Public Disclosure No. 59-39205 filed on Sept. 8, 1982, and laid open to the public on Mar. 13, 1984. The suspension mechanism disclosed in the Japanese Utility model application, as shown in FIG. 4, is provided with a lower arm 61 which is swingably connected with a cross member 60 at one end 61a thereof and fixed at the other end 61b to a knuckle 62 by which a wheel 63 is carried, an assist link 64 which is swingably connected with the cross member 60 at one end thereof 64a, and fixed at the other end 64b thereof to the lower arm 61, the assist link being inclined in the longitudinal direction of the vehicle, and a stabilizer 65 fixed to the lower arm 61 at one end 65a thereof through a long bolt like control link 66.

Meanwhile, in the field of the automobile industry, it has been proposed to reduce the number of parts used for assembling a vehicle by utilizing common parts to thereby reduce a manufacturing cost. In this regard, it is preferable that common parts are used for assembling right and left suspension mechanisms. In suspension mechanisms, the lower arms 61 are generally disposed so as to extend from the cross member 60 respectively in the transverse direction of the vehicle with a symmetrical relationship with each other with regard to the longitudinal axis of the vehicle so that the lower arms 61 can be commonly constituted for the right and left suspension mechanisms in veiw of the structure thereof. On the other hand, the assist links 64 are disposed in an angular direction to the longitudinal direction of the vehicle. Therefore, it is impossible to manufacture the assist links 65 as common parts for the right and left suspension mechanism.

It should however be noted that in conventional suspension mechanisms as disclosed in the above Japanese application, the lower end of the control link 66 fixed to the stabilizer 65 is mounted on the upper side of the lower arm 61 so that the lower arms for the right and left suspension mechanisms cannot be manufactured as an identical structure unless the connecting portion of the control link 66 is formed on a symmetrical axis of the lower arm 61. Accordingly, it is apparent that in order to provide the lower arm with a common structure to a right and left suspension mechanism, it is necessary to form the connecting opening for the control link on the symmetrical axis. However, this may limit a free design of the suspension mechanism with regard to the location of the connection portion. Since an appropriate torsional stiffness is required for an assembly constituted by the stabilizer 65 and the control link 66 so as to provide the vehicle body with a desirable rolling stiffness of the vehicle, the sizes and lengths thereof should be properly determined. As a matter of fact, it may be difficult to form the connecting poriton on the symmetrical axis of the lower arm 61 so as to provide the stabilizer 65 and the control link 66 with such appropriate lengths and sizes.

SUMMARY OF THE INVENTION

It is therefore an object of the present invention to provide a suspension mechanism in which parts can be highly commonly used for assembly right and left suspension mechanisms to thereby save a manufacturing cost of vehicle.

It is another object of the present invention to make lower arms common in structure in manufacturing right and left suspension mechanisms provided with lower arms, assist links and a stabilizer.

The above and other objects of the present invention can be accomplished by a suspension mechanism including a lower arm carried by a vehicle body at one end and rotatably mounted on a wheel holding member at the other end, an assist link swingably mounted on the vehicle body at one end and fixed to the lower arm at the other end and a stabilizer of a certain torsional stiffness provided with a control link at one end portion, the control link being connected at one end to the assist link.

According to the present invention, the control link of the stabilizer is not connected with the lower arm but with the assist link so that the lower arm can be constructed to be common to a right and left suspension mechanism obtaining an appropriate rolling stiffness of the vehicle.

DETAILED DESCRIPTION OF THE PREFERRED EMBODIMENT

Figure 1:
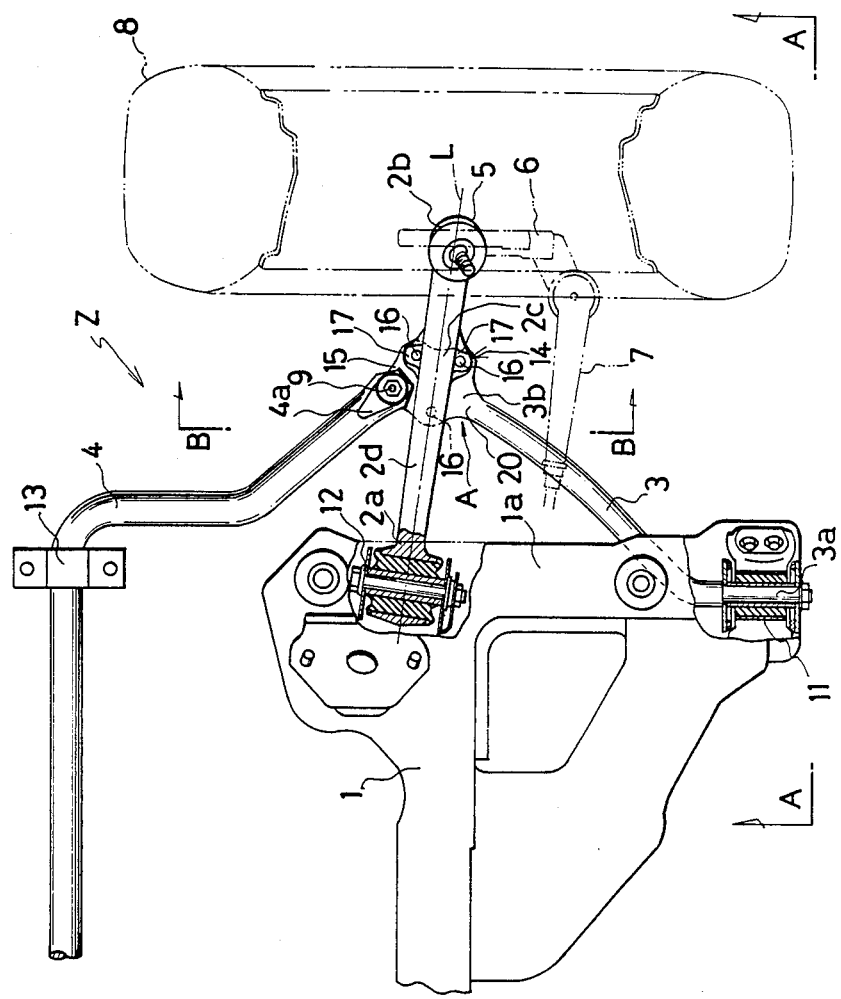
FIG. 1 is a partially sectional plan view of a suspension mechanism in accordance with the present invention.
Figure 2:
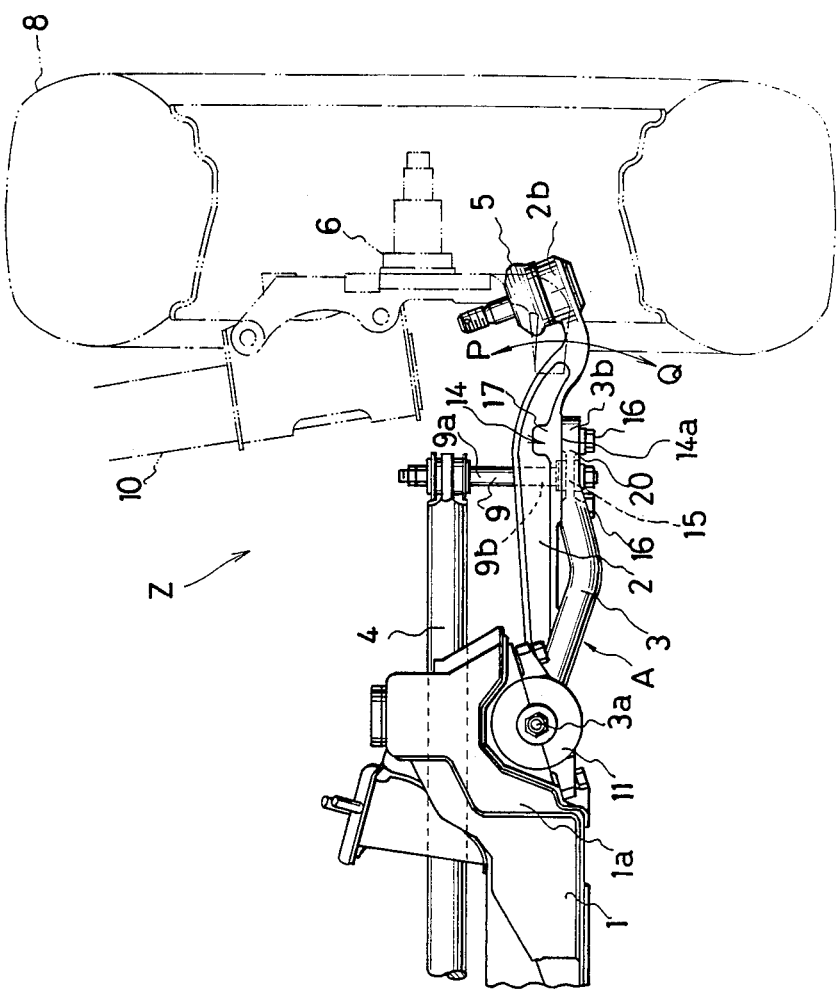
FIG. 2 is an elevational view shown along line A—A in FIG. 1.

Now referring to FIGS. 1 and 2, there is shown a right front suspension mechanism Z including a cross member 1 laterally disposed. The opposite end portions 1a and 1b of the cross member 1, one of which is shown in FIGS. 1 and 2, are extended transversely outwardly to form a substantially triangle like frame. At the one end portion 1a, a lower arm 2 and an assist link 3 are swingably connected with the cross member 1 in the vertical direction. The positions where the lower arm 2 and the assist link 3 are connected with the cross member are aligned in the longitudinal direction of vehicle.

Figure 3:
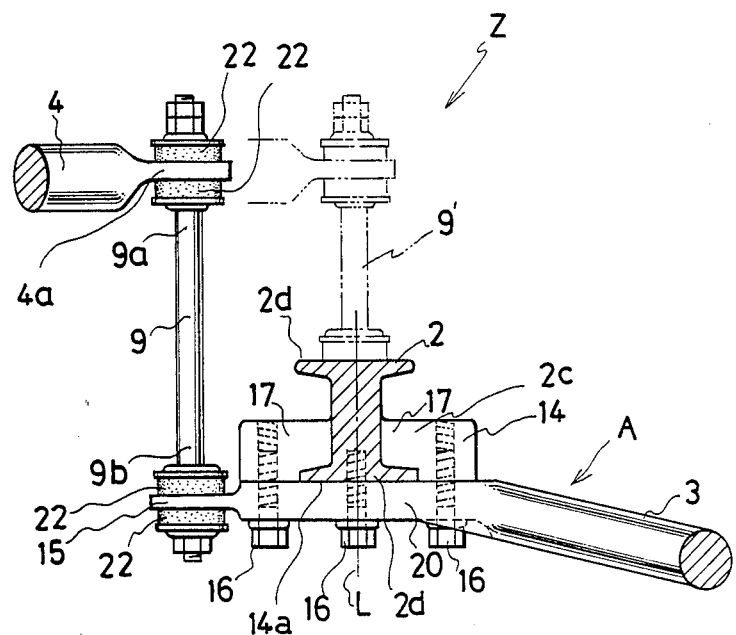
FIG. 3 is a sectional view taken along line B—B in FIG. 1.
Figure 4:
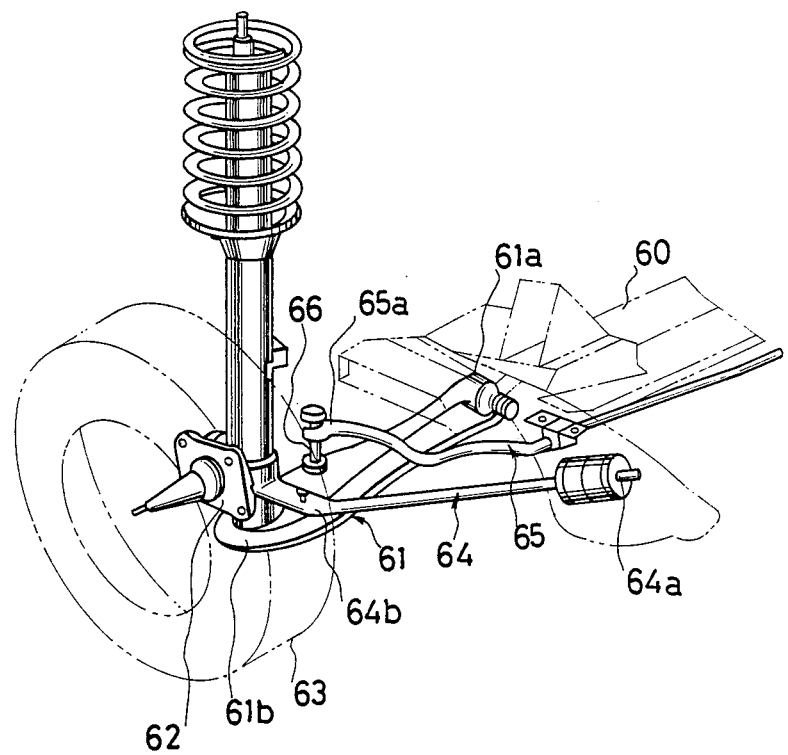
FIG. 4 is a perspective view of a conventional suspension mechanism.

The lower arm 2, as shown in FIGS. 1 and 3, has a substantially I shaped cross section and is symmetrical relative to a line L. The lower arm 2 is swingably carried at one end 2a in the vertical direction by means of a support member 12 disposed on a front end portion of the cross member 1 so as to restrain a vibration thereof. At the other end portion 2b of the lower arm 2 is mounted a ball joint 5 to which a knuckle arm 6 is connected for carrying a wheel 8.

At a middle portion 2c of the lower arm 2 are formed a pair of boss portions 17 projecting horizontally for constituting an assist link support member 14 which supports the assist link 3. Bolts 16 are adapted to be brought into engagement with the boss portions 17 and the lower arm 2 at a postion on the symmetrical axis L wherein the position is located at one of vertexes of a triangle defined together with positions of the boss portions 17.

The assist link 3 is of a substantially circular cross section and a L-shaped configuration rod, one end 3a of which is swingably connected in the vertical direction with the cross member 1 through a support member 11 provided on the rear end portion of the cross member. The other end 3b of the assist link 3 has a plate like configuration to form a connecting portion 20 to the support member 14 provided in the lower arm 2. It will therefore be understood that the connecting portion 20 of the assist link 3 is engaged with the support member 14 mounted on the lower arm 2 at the lower surface 4a of the support member 14 and fastened together by means of the bolts 16 so as to constitute a integrated arm assembly A. One end of the arm assembly A or one end 2b of the lower arm 2 is swingably carried by the vehicle body through a suspension strut 10 connected to the knuckle arm 6 so that the arm assembly A can swing in the vertical direction as shown in FIG. 2 by arrow P-Q in accordance with a force acting on the wheel 8.

Furthermore, the assist link 3 is extended forwardly in the vicinity of the connecting portion 20 for the support member 14 to form a support portion 15 for supporting the stabilizer 4. The stabilizer 4 is carried at intermediate portions thereof by another support member 13. A control link 9 of a long bolt like configuration is connected at the upper end 9a thereof to one end 4a of the stabilizer 4. The lower end 9b of the control link 9 is fixed to the support member 15.

As described above, in the suspension mechanism Z according to the present invention, the control link 9 connected with the stabilizer 4 at the one end is fixed the supporting portion 15 of the assist link 3 so that the lower arm can be symmetrically constituted relative to the axis L to enable the lower arm 2 to use commonly to both right and left suspension mechanisms without any modification.

In this embodiment, the connecting portion 20 of the assist link 3 is fixed at the lower side thereof to the support member 14 for the lower arm 2 and the control link 9 is connected to the connecting portion 20 at the lower end 9b. It will therefore be understood that the control link 9 can be extended downwardly in comparison with the conventional construction (shown by a chain line in FIG. 3) in which the control link is connected to the upper side 2d of the lower arm 2 enabling to make the control link long as the stabilizer cannot be positioned at a higher level because of the interference with the vehicle body. As a result, when the connecting portion 20 swings in the vertical direction, the deflection angle of the control link is reduced in comparison with the shorter control link 9' of the conventional construction so that the amount of the deflection in bushes 22 provided in respective connecting portion can be reduced to obtain a reliability thereof and the suspension system.

In relation to this aspect, accoding to the present invention, the distance between the stabilizer 4 and the lower end of the vehicle body can be sufficiently obtained with a desirable length of the control link 9. This means the suspension mechanism of the present invention is advantageous in layout of engine and the like.

I claim:

1. A lower arm for use in a vehicle suspension mechanism, said lower arm comprising:
   an elongated arm symmetrical about a longitudinal axis,
   a rubber bushing fixed to one end of said elongated arm and defining a pivoting axis transverse to said longitudinal axis of said elongated arm,
   a ball joint fixed to the other end of said elongated arm,
   a mid-portion of said elongated arm defining a pair of projections disposed on opposite sides of said longitudinal axis,
   said pair of projections being symmetrically shaped and disposed relative to said longitudinal axis, and
   said elongated arm defining at least three bores, two of bores being symmetrically defined in said pair of projections and a third bore defined coinicident with said longitudinal axis and longitudinally spaced from said two bores.

2. A suspension mechanism in accordance with claim 1 in which the lower arm is of a substantially I-shaped cross section.

3. In combination for use in a vehicle suspension mechanism, a lower arm and an assist link, said lower arm comprising an elongated arm symmetrical about a longitudinal axis, a rubber bushing fixed to one end of said elongated arm and defining a privoting axis transverse to said longitudinal axis of said elongated arm,
   a ball joint fixed to the other end of said elongated arm,
   a mid-portion of said elongated arm defining a pair of projections disposed on opposite sides of said longitudinal axis,
   said pair of projections being symmetrically shaped and disposed relative to said longitudinal axis,
   said arm defining at least three bores, two bores being symmetrically defined in said pair of projections and a third bore defined coincident with said longitudinal axis and longitudinally spaced from said two bores,
   said assist link comprising an elongated link, a rubber bushing fixed to one end of said assist link, he other end of said assist link defining at least three through bores spatially disposed to aligned and register with the at least three bores defined in said lower arm, and
   fastening means cooperating with said bores for fastening said lower arm and assist link together.

4. A suspension mechanism in accordance with claim 3 in which the assist link is mounted at the lower side of the lower arm.

5. In a vehicle suspension mechanism including a lower arm, an assist link, a control link and a stabilizer, said lower arm comprising an elongated arm symmetrical about a longitudinal axis, a rubber bushing fixed to one end of said elongated arm and defining a pivoting axis transverse to said longitudinal axis of said elongated arm, a ball joint fixed to the other end of said arm, a mid-portion of said elongated arm defining a pair of projections disposed on opposite sides of said longitudinal axis, said pair of projections being symmetrically shaped and disposed relative to said longitudinal axis, and said elongated arm defining at least three bores, two bores being symmetrically defined in said pair of projections and a third bore defined coincident with said longitudinal axis and longitudinally spaced from said two bores, said assist link comprising an elongated link, a rubber bushing fixed to one end of said assist link, the other end of said assist link defining at least three through bores spatially disposed to align and register with the at least three bores defined in said lower arm, and fastening means cooperating with said bores for fastening said lower arm and assist link together, said control link being formed with an elongated rod portion extending substantially perpendicular to said lower arm and connected to said lower arm at one end and to said stabilizer at the other end, and said stabilizer comprising an arcuate rod connected at an end portion to said other end of said control link at a substantially right angle.

6. In an automobile, the combination comprising a vehicle cross member, a suspension mechanism, and a wheel holding member, said suspension mechanims connecting said vehicle cross member and said wheel holding mechanism, said suspension mechanism including a lower arm, an assist link, a conrol link and a stabilizer, said lower arm comprising an elongated arm symmetrical about a longitudinal axis, a rubber bushing fixed to one end of said elongated arm and defining a pivoting axis transverse to said longitudinal axis of said elongated arm, a ball joint fixed to the other end of said arm, a mid-portion of said elongated arm defining a pair of projections disposed on opposite sides of said longitudinal axis, said pair of projections being symmetrically shaped and disposed relative to said longitudinal axis, and said elongated arm defining at least three bores, two bores being symmetrically defined in said pair of projections and a third bore defined coincident with said longitudinal axis and longitudinally spaced from said two bores, said assist link comprising an elongated link, a rubber bushing fixed to one end of said assist link, the other end of said assist link defining at least three through bores spatially disposed to align and register with the at least three bores defined in said lower arm, and fastening means cooperating with said bores for fastening said lower arm and assist link together, said control link being formed with an elongated rod portion extending substantially perpendicular to said lower arm and connected to said lower arm at one end and to said stabilizer at the other end, and said stabilizer comprising an arcuate rod connected at an end portion to said other end of said control link at a substantially right angle.

7. In an automobile, the combination comprising a vehicle cross member, a left suspension, a right suspension, a right wheel holding member, a left wheel holding member, and a stabilizer, said left suspension connecting said left wheel holding member and said vehicle cross member and said right suspension connecting said right wheel holding member and said vehicle cross member, said left suspension and said right suspension each including a lower arm, an assist link, and a control link, said lower arm comprising an elongated arm symmetrical about a longitudinal axis, a rubber bushing fixed to one end of said elongated arm and defining a pivoting axis transverse to said longitudinal axis of said elongated arm, a ball joint fixed to the other end of said arm, a mid-portion of said elongated arm defining a pair of projections disposed on opposite sides of said longitudinal axis, said pair of projections being symmetrically shaped and disposed relative to said longitudinal axis, and said elongated arm defining at least three bores, two bores being symmetrically defined in said pair of projections and a third bore defined coincident with said longitudinal axis and longitudinally spaced from said two bores, said assist link comprising an elongated link, a rubber bushing fixed to one end of said assist link, the other end of said assist link defining at least three through bores spatially disposed to align and register with the at lest three bores defined in said lower arm, and fastening means cooperating with said bores for fastening said lower arm and assist link together, said control link being formed with an elongated rod portion extending substantially perpendicular to said lower arm and connected to said lower arm at one end and to said stabilizer at the other end, and said stabilizer comprising an arcuate rod connected at opposite end portions to said other end of said control link of said left suspension and said right suspension at a substantially right angle.

* * * * *